UNITED STATES PATENT OFFICE.

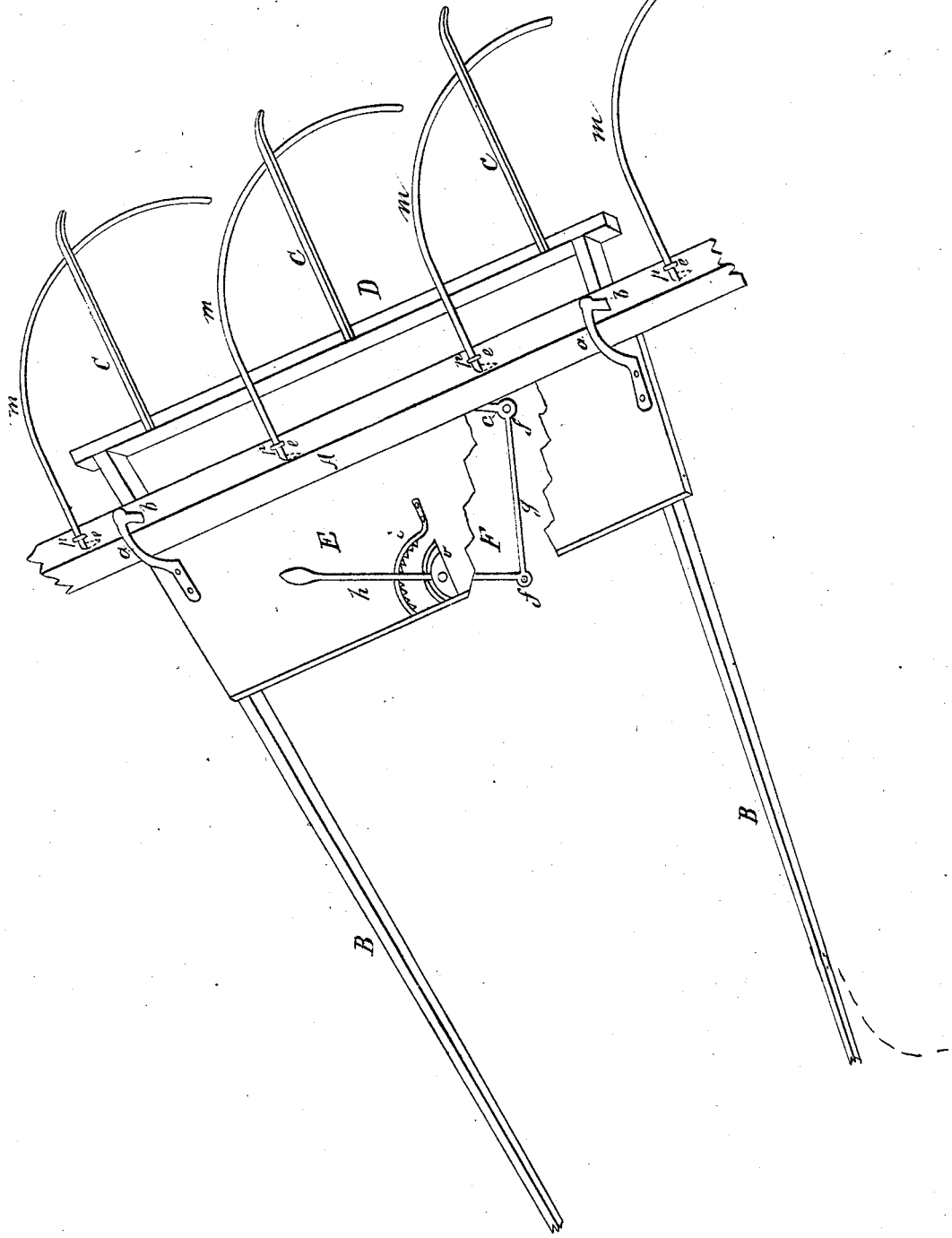

A. C. STONE, OF STEELEVILLE, PENNSYLVANIA.

IMPROVEMENT IN HORSE-RAKES.

Specification forming part of Letters Patent No. 50,853, dated November 7, 1865.

*To all whom it may concern:*

Be it known that I, A. C. STONE, of Steeleville, in the county of Lancaster, in the State of Pennsylvania, have invented a new and Improved Mode of Discharging the Windrow from the Teeth of Horse-Rakes by the Action of the Horse; and I do hereby declare that the following is a full and exact description thereof, reference being had to the accompanying drawings, and to the letters of reference marked thereon.

The nature of my invention consists in attaching the teeth of the rake to a movable axle, and then, by the connection of said axle to the shafts, giving it the amount of rotatory motion necessary to raise the teeth.

To enable others skilled in the art to make and use my improvement, I will proceed to describe its construction and operation.

I construct an ordinary axle, A, of the accompanying drawings, upon which I fasten the teeth $m\,m\,m\,m$ in the following manner: I sharpen and bend downward at right angles about one inch of the end of the tooth, as seen at $e\,e\,e\,e$, and drive this point into the axle at the place where I desire the tooth to remain. I then further secure it in its position by a staple, $p\,p\,p\,p$, passing over the tooth and driven into the axle. By this means I secure a simple, cheap, and durable attachment.

I construct my shafts B B by framing one end into a cross-piece, D, into which cross-piece I insert the clearers C C C, and upon the shafts, in front of the axle, I place the platform E. The shafts B B, constructed as described, are placed under the axle, and are attached to it by means of the joints formed by the bent arms $a\,a$ of the platform and the uprights $b\,b$ on the axle. The axle A is placed sufficiently above the shafts to allow it to rotate without touching them.

In the center of the axle, and passing down from its lower surface, is placed a short lever, $c$. This lever is firmly secured to the axle, and, through the lever $h$, joints $f\,f$, and rod $g$, (seen in the opening F of the platform,) is designed to bring down the teeth after discharging.

Passing through the platform, and working on a pivot at $o$, is the upright lever $h$. This lever is kept in its place by means of a ratchet, $i$, fastened on the platform, and is under the control of the driver when the rake is in operation.

From the foregoing description it will be seen that when the axle is mounted on wheels and drawn by the shafts the following operation must take place: The teeth having collected the necessary quantity of hay or grain, the driver, by a touch of his hand, liberates the lever $h$ from the ratchet $i$. The horse, pulling by the shafts B B, draws those shafts forward, and, being attached to the axle A by the bent arms $a\,a$ and uprights $b\,b$, the axle is necessarily turned and the teeth raised. The windrow being discharged, the driver, by pulling back the lever $h$ through the joints $f\,f$ and rod $g$, the axle is readjusted and the teeth placed in their original position ready for another operation.

What I claim as my invention, and wish to secure by Letters Patent, is—

Attaching the thills (or shafts) B B to the axle by the bent arms $a\,a$, hinged to the upper side of said axle, so that the load will be discharged from the rake by the power of the draft animal, substantially as herein described.

A. C. STONE.

Witnesses:
A. V. B. ORR,
J. M. ORR.